July 30, 1935. R. B. SIMNING 2,009,681
SELF-ADJUSTING VEHICLE BRAKE
Filed June 19, 1933
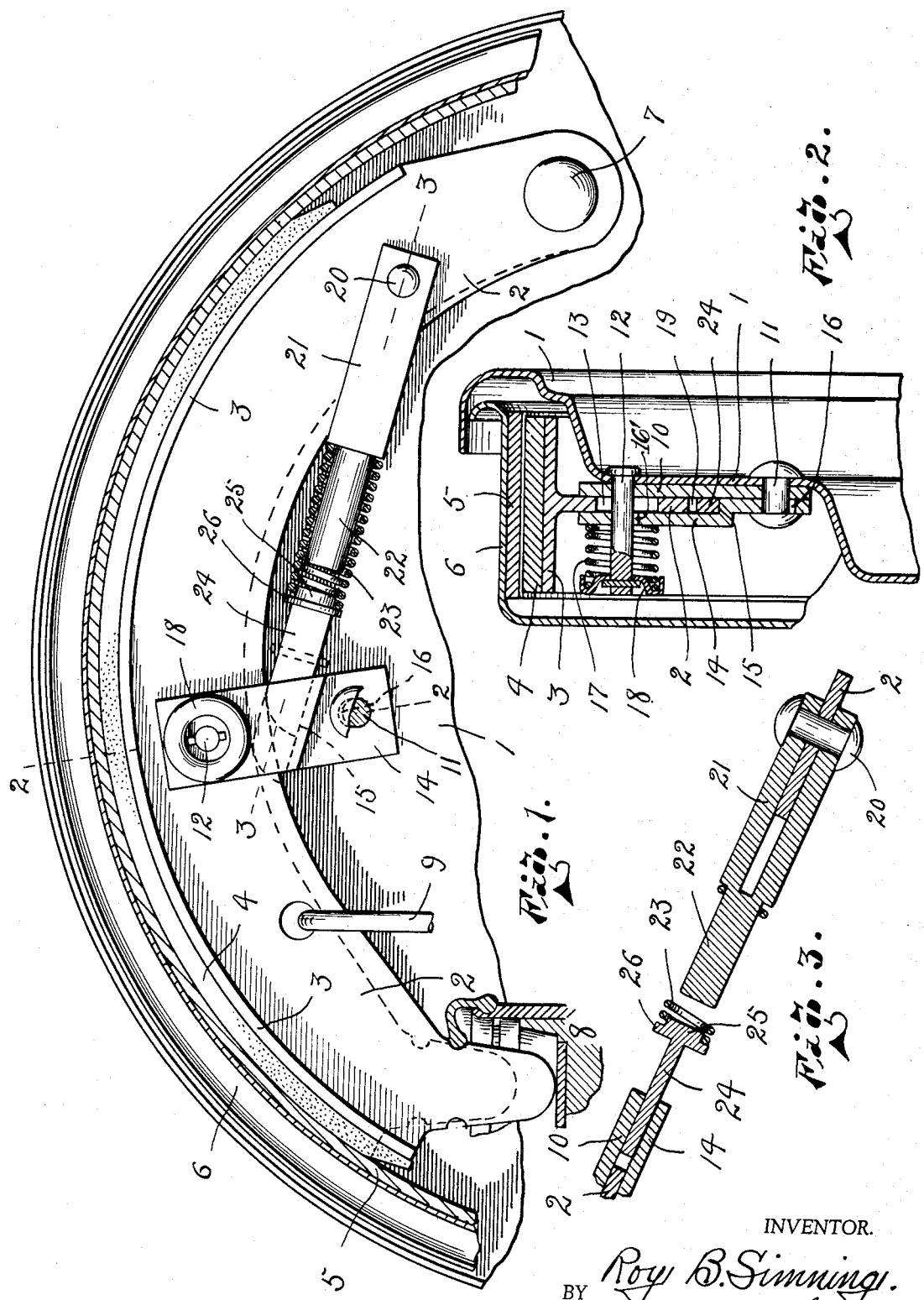
INVENTOR.
BY Roy B. Simning.
Leo Stevens
ATTORNEY.

Patented July 30, 1935

2,009,681

UNITED STATES PATENT OFFICE 2,009,681

SELF-ADJUSTING VEHICLE BRAKE

Roy B. Simning, Minneapolis, Minn., assignor to San-Esl Co., Minneapolis, Minn., a firm composed of Clement E. Nelson, George E. Sandberg, Elmer L. Sandberg, and Roy B. Simning Application June 19, 1933, Serial No. 676,522

5 Claims. (Cl. 188—79.5)

This invention relates to brake shoe adjustment devices and has special reference to an automatic or self-adjusting mechanism for brake shoes of automobiles, or the like.

The principal object is to provide a simple and dependable mechanism of this type.

Another object is to provide such a device having uniform action throughout the entire life of the brake shoe lining.

Another object is to provide a mechanism of this type requiring as little change as possible in the ordinary brake shoe and one free from the annoyance of rattling, and necessitating the minimum of attention after being installed.

Other objects and advantages of the invention will appear in the following description thereof.

Referring now to the accompanying drawing, forming part of this application, and wherein like reference characters indicate like parts:

Figure 1 is a side elevation of one half of a common hydraulic brake shoe assembly, with the invention attached and the brake applied, portions thereof being shown in section for convenience of illustration.

Figure 2 is a section on the line 2—2, Figure 1, with the exception that the brake is retracted.

Figure 3 is a section on the line 3—3, Figure 1.

It is well known that some automobiles are provided with hydraulic service brake mechanism controlled by a foot pedal having an approximate maximum travel of about seven inches, of which only about three inches is actually employed for direct application of power to the brake; the other four inches being utilized in the yieldability of the parts and connections, together with a suitable margin of safety in respect to action on the part of the operator. Thus the seven inch stroke will take care of only about one-eighth inch wear on the brake lining without readjustment of the brake. However the normal wear of a brake lining is approximately one-fourth inch so that if automatic compensation for lining wear is accomplished without in any way altering the throw of the foot pedal, and this to the entire utilization of the lining as by the instant invention, the advantages become obvious, for example, in the elimination of expense in connection with frequent brake shoe adjustments. With the instant device the shoes would be adjusted when the linings were new and not again require adjustment even when the linings were worn out, provided the same size linings were used at the time of renewal.

In the embodiment here illustrated, 1 represents the backing plate carrying the brake shoe assembly of an automobile, and 2 the web of a common hydraulically operated brake shoe, though it is to be understood that the invention is applicable to any type of brake assembly, either manually, hydraulically, or otherwise operated.

The brake shoe here illustrated is of T-shape in cross section, the horizontally disposed rim portion being illustrated at 3, which portion carries the brake lining 4. In this instance there is illustrated a lining 5 fixed to and within the drum 6 of the brake housing.

The shoe 2—3 is pivotally mounted in the usual manner as at 7, and operated by pressure of the hydraulic cylinder 8, or other device, at the opposite end, the retracting spring connection being illustrated at 9, all of which are common in the art.

The automatic adjustment assembly comprises the installation of the member 10 attached to the backing plate and which attachment is accomplished by the rivet 11 at one end and the pin 12 at the opposite end passing through the web 2 of the shoe. The pin 12 extends through a radially elongated slot 13 in the web 2 of the shoe, and through a similarly shaped plate 14 installed upon the opposite side of the web 2, though this latter plate 14 is jogged or offset adjacent its lowermost end, forming an internally inclined shoulder or bearing 15, spaced from the inner edge of the web 2 and from this point contacts the face of the member 10, and is held in position by the rivet 11 entering same through a slightly radially elongated slot 16. This connection is made anti-rattling by the pin 12 being elongated and extending some considerable distance beyond the plate 14 where it is circumvented by the expansive helical spring 17 held in position by the cap 18, insuring constant yieldable contact of the plate 14 against the web 2 of the brake shoe. Thus there is provided a rectangularly shaped space 19 intermediate of the innermost edge of the web 2 and the shoulder 15 between the plates 14 and 10. It is to be noted that a predetermined elongation of the hole 16 is provided in the plate 14 for reception of the rivet 11, as well as an elongation of the hole 16' in said plate through which the pin 12 passes, and this predetermined elongation of the holes also determines the constant spacing of the lining 4 from the cooperating face of the brake drum when the brake is in its unapplied position. This space is approximately $\frac{1}{32}''$, which is considered ideal for best results, it being understood that the plate 14 is free to move radially just that predetermined distance when applied or retracted, the latter motion being accomplished by the retracting spring 9.

Towards the end of the shoe, which is pivoted at 7, is pivotally mounted, as at 20, the rectangularly shaped bifurcated arm 21, the outermost end of which is cylindrically formed as at 22 and surmounted by an expansive helical spring 23. In the outermost end of this spring is carried the compensating wedge 24, it being cylindrical in form as at 25 where it is carried in the spring and is flanged as at 26 to prevent dislodgment therefrom, while the remainder of the wedge is rectangular in shape and of the exact width of the web 2 of the shoe so that it fits readily within the space 19 beneath said web and rides upon the inclined shoulder 15 of the outer plate 14. The outermost end of this wedge is arcuate in shape so as to bear upwardly against the lower edge of the web of the shoe with the tendency at all times to keep the web of the shoe in maximum spaced relation from the shoulder 15; and the wedge 24 is thus constantly urged by the spring 23 to such service, thus insuring a uniform movement of the shoe at each application.

The action of the device is as follows:

Assuming the brake shoe as being provided with a new lining 4 and in the engaged position as illustrated in Fig. 1 of the drawing, the wedge 24 will remain in its substantially fully retarded position intermediate of the web 2 of the shoe and the shoulder 15 of the compensating mechanism and in no way interfere with the free movement of the brake shoe by the normal operating mechanism therefor except that the plate 14, which carries the wedge on its shoulder 15, is limited by the $\frac{1}{32}$" space about the rivet or pin 11; it being understood that the shoe is biased constantly toward its fully retracted position by the retracting spring 9 before the wedge 24 was allowed to enter within the space 19, so that the wedge 24 is constantly taking up any differentiation that exists between the limits of the shoulder 15 and the inner edge of the web of the shoe 2 which occurs by reasons of the wear of the lining, thus, at all times, maintaining a uniform distance of movement of the shoe.

It will of course be understood that the retracting spring is of ample strength at all times to overcome the urge of the wedge by the spring 23, and that the spring 17 is sufficiently strong to provide ample frictional engagement of the plate 14 against the shoe web 2 to prevent action of the wedge 24 until the $\frac{1}{32}$" clearance about the rivet 11 is taken up, and if further movement of the shoe occurs by reason of wear, and overcomes the action of the spring 17, as well as spring 9, then the wedge will enter to compensate for such additional movement so that the brake shoe movement is virtually always the same.

Having thus described my invention, what I claim and desire to secure by Letters Patent, is:

1. An automatic brake shoe adjuster comprising means having a bearing shoulder thereon radially movably attached to a brake shoe housing, and wedging means pivotally carried by the brake shoe and extending between said shoulder and said brake shoe for the purpose specified.

2. In a vehicle brake including a brake drum, a brake shoe movable against said drum, and levers for forcing said shoe against said drum, the combination of means having an offset shoulder therein radially movably attached to said shoe, automatically adjustable means pivotally fixed to said shoe and constantly engageable between said shoe and shoulder to prevent movement of the shoe except within the limits of radial movement of said first mentioned means.

3. In a vehicle brake including a brake drum and housing therefor, and a brake shoe movable against said drum, the combination of means radially movably mounted upon said housing, a spring biased wedging member pivoted on said shoe and constantly bearing between the shoe and said radially movable means to prevent movement of said shoe except within the limits of said radial movement.

4. In a vehicle brake including a brake drum and housing therefor, and a brake shoe movable against said drum, the combination of radially movable means attachable to said shoe and said housing and permitted to move with said shoe within fixed predetermined limits, and a wedging arm pivoted to said shoe and cooperative with said movable means to compensate for wear of said brake shoe.

5. In a vehicle brake including a brake drum and housing therefor, and a brake shoe movable against said drum, the combination of means radially movably carried by said housing and shoe and permitted to move with said shoe only within predetermined fixed limits, and a spring actuated wedging arm extendable between said movable means and said shoe to automatically adjust said shoe relative to said movable means to compensate for wear of said brake shoe.

ROY B. SIMNING.